US006266118B1

United States Patent
Lee et al.

(10) Patent No.: US 6,266,118 B1
(45) Date of Patent: Jul. 24, 2001

(54) LIQUID CRYSTAL DISPLAY OF HIGH APERTURE RATIO AND HIGH TRANSMITTANCE HAVING MULTI-DOMAIN HAVING TRANSPARENT CONDUCTIVE PIXEL AND COUNTER ELECTRODES ON THE SAME SUBSTRATE

(75) Inventors: Seung Hee Lee, Kyoungki-do; Seok Lyul Lee, Seoul; Youn Hak Jeong, Kyoungki-do, all of (KR)

(73) Assignee: Hyundai Electronics Industries Co., Ltd., Kyoungki-do (KR)

( * ) Notice: Subject to any disclaimer, the term of this patent is extended or adjusted under 35 U.S.C. 154(b) by 0 days.

(21) Appl. No.: 09/320,084

(22) Filed: May 26, 1999

(30) Foreign Application Priority Data

May 29, 1998 (KR) .................................................. 98-19608

(51) Int. Cl.[7] .................................................. G02F 1/1343
(52) U.S. Cl. ............................................................ 349/141
(58) Field of Search ............................... 349/42, 43, 132, 349/141; 345/92

(56) References Cited

U.S. PATENT DOCUMENTS

| 5,734,451 | | 3/1998 | Yanagawa et al. | 349/43 |
| 5,760,857 | * | 6/1998 | Yanagawa et al. | 349/141 |
| 5,847,687 | | 12/1998 | Hirataka et al. | 345/96 |
| 5,926,244 | * | 7/1999 | Takeda et al. | 349/141 |
| 5,977,562 | * | 11/1999 | Hirakata et al. | 349/141 |
| 6,052,168 | * | 4/2000 | Nishida et al. | 349/141 |

FOREIGN PATENT DOCUMENTS

| 7-128683 | 5/1995 | (JP) . |
| 9-080436 | 3/1997 | (JP) . |
| 9-269504 | 10/1997 | (JP) . |
| 10-062788 | 3/1998 | (JP) . |
| 10-104633 | 4/1998 | (JP) . |
| 10-186366 | 7/1998 | (JP) . |
| 10-221705 | 8/1998 | (JP) . |
| 10-260431 | 9/1998 | (JP) . |
| 10-268305 | 10/1998 | (JP) . |

* cited by examiner

Primary Examiner—Walter J. Mallnowski
(74) Attorney, Agent, or Firm—Ladas & Parry

(57) ABSTRACT

Disclosed is a liquid crystal displace capable of improving picture quality and having enhanced aperture ratio and transmittance. The liquid crystal display comprises: upper and lower substrates opposed and spaced apart, wherein homogeneous alignment layers are formed at inner surfaces of both substrates; a liquid crystal layer including a plurality of liquid crystal molecules and interposed between the upper and lower substrates; a gate bus line and a data bus line formed between the lower substrate and the homogeneous alignment layer in a matrix configuration thereby defining unit pixel regions; transparent counter and pixel electrodes for driving the liquid crystal molecules formed at a unit pixel region in the lower substrate; and a thin film transistor disposed at an intersection of the gate bus line and the data bus line, and switching the pixel electrode, wherein, when a voltage is applied to the pixel electrode, there are formed electric fields respectively parallel to the gate bus line and the data bus line simultaneously and the liquid crystal molecules on and between the counter and pixel electrodes are all driven by the electric fields.

23 Claims, 7 Drawing Sheets

LIQUID CRYSTAL DISPLAY OF HIGH APERTURE RATIO AND HIGH TRANSMITTANCE HAVING MULTI-DOMAIN HAVING TRANSPARENT CONDUCTIVE PIXEL AND COUNTER ELECTRODES ON THE SAME SUBSTRATE

FIELD OF THE INVENTION

The present invention generally relates to a liquid crystal display, and more particularly to a liquid crystal display capable of preventing color shift and simultaneously improving its aperture ratio and transmittance.

BACKGROUND OF THE INVENTION

Liquid crystal display devices have been used in various information display terminals and video devices. The major operating system for the liquid crystal display device is the twisted nematic ("TN") mode and the super twisted nematic ("STN") mode. Though they are commercially used in the market at present, the problems of narrow viewing angle are still remained unsolved.

An In-Plane Switching ("IPS") mode liquid crystal display has been suggested to solve foregoing problems.

As described in FIG. 1, a plurality of gate bus lines 11 are formed on a lower insulating substrate 10 along an x direction shown in the drawings and the gate bus lines 11 are parallel to each other. A plurality of data bus lines 15 are formed along an y direction which is substantially perpendicular to the x direction. Therefore a pixel region is defined. At this time, a pair of gate bus lines 11 and a pair of data bus lines 15 are shown in the drawing so as to define the pixel region. The gate bus line 11 and the data bus line 15 are insulated by a gate insulating layer (not shown).

A counter electrode 12, for example in the form of a rectangular frame, is formed within the pixel region and it is disposed at the same plane with the gate bus line 11.

A pixel electrode 14 is formed at each pixel region where the counter electrode 12 is formed. The pixel electrode 14 consists of a web region 14a which divides the region surrounded by the rectangular frame shaped counter electrode 12 in the y direction, a first flange region 14b connected to one end of the web region 14a and simultaneously overlapped with the counter electrode 12 of the x direction, and a second flange region 14c which is parallel to the first flange region 14 and is connected to the other end of the web region 14a. That is to say, the pixel electrode 14 seems the letter "I". Herein, the counter electrode 12 and the pixel electrode 14 are made of opaque metal layers. To ensure an appropriate intensity of electric field, the width of both counter and pixel electrodes is preferably in the range of 10~20 μm.

The pixel electrode 14 and the counter electrode 12 are insulated from each other by a gate insulating layer (not shown).

A thin film transistor 16 is disposed at the intersection of the gate bus line 11 and the data bus line 12. This thin film transistor 16 includes a gate electrode being extended from the gate bus line 11, a drain electrode being extended from the data bus line 15, a source electrode being extended from the pixel electrode 14 and a channel layer 17 formed on the upper portions of the gate electrode.

A storage capacitor (Cst) is disposed at the region where the counter electrode 12 and the pixel electrode 14 are overlapped.

Although not shown in FIG. 1, an upper substrate (not shown) equipped with a color filter (not shown) are disposed on the first substrate 10 opposite to each other with a selected distance. Herein, the distance between the upper substrate and lower substrate 10 is smaller than the distance between the counter electrode region in the y direction and the web region of the pixel electrode thereby forming an electric field which is parallel to the substrate surface. Further, a liquid crystal layer (not shown) having a plurality of liquid crystal molecules is interposed between the upper substrate (not shown) and the lower substrate 10.

Also, onto the resultant structure of the lower substrate and onto an inner surface of the upper substrate are formed homogeneous alignment layers respectively. By the homogeneous alignment layer, in the absence of electric field between the counter electrode 12 and the pixel electrode 14, long axes of liquid crystal molecules 19 are arranged parallel to the substrate surface. Also, by the rubbing axis of the homogeneous alignment layer, the orientation direction of the molecules 19 is decided. The reference R in the drawings means the direction of rubbing axis for the homogeneous alignment layer formed on the lower substrate 10.

A first polarizing plate (not shown) is formed on the outer surface of the lower substrate 10 and a second polarizing plate (not shown) is formed on the outer surface of the upper substrate (not shown). Herein, the first polarizing plate is disposed to make its polarizing axis to be parallel to the P direction of the FIG. 1. That means, the directions of rubbing axis R and polarizing axis P are parallel each other. On the other hand, the polarizing axis of the second polarizing plate is substantially perpendicular to that of the first polarizing plate.

When a scanning signal is applied to the selected gate bus line 11 and a display signal is applied to the data bus line 15, the thin film transistor 16 disposed adjacent to the intersection of the gate bus line 11 and the data bus line 15 is turned on. Then the display signal of the data bus line 15 is transmitted to the pixel electrode 14 through the thin film transistor 16. Consequently, an electric field E is generated between the counter electrode 12 where a common signal is inputted and the pixel electrode 14. At this time, as the direction of electric field E is referenced as x direction as described in the FIG. 1, it has a predetermined degree of angle with the rubbing axis.

Afterward, when no electric field is generated, the long axes of the liquid crystal molecules are arranged parallel to the substrate surface and parallel to the rubbing direction R. Therefore the light passed through the first polarizing plate and the liquid crystal layer, is unable to pass the second polarizing plate, the screen shows dark state.

On the other hand, when the electric field is generated, the long axes (or short axes) are rearranged parallel to the electric field, therefore the incident light passed through the first polarizing plate and the liquid crystal layer, passes the second polarizing plate, the screen shows white state.

At this time, the direction of the long axes of the liquid crystal molecules changes according to the electric field, and the liquid crystal molecules themselves are arranged parallel to the substrate surface. Accordingly, the viewer can see the long axes of liquid crystal molecules at all directions, and the viewing angle characteristic is improved.

However, the IPS mode liquid crystal display as described above also includes following problems.

It is well known that the refractive anisotropy (or birefringence, Δn) is occurred due to the difference in lengths of the long and the short axes. The refractive anisotropy Δn also varies according to the viewer's viewing directions. Therefore a selected color can be shown in the region where the polar angle is of 0 degree and the azimuth angle is in the range of degrees 0, 90, 180 and 270, even in the white state screen. This regards as color shift and more detailed description thereof is attached with reference to the equation 1.

$$T \approx T_0 \sin^2(2\chi) \cdot \sin^2(\pi \cdot \Delta nd/\lambda) \qquad \text{equation 1}$$

wherein,

T: transmittance;

$T_0$: transmittance to the reference light;

$\chi$: angle between an optical axis of liquid crystal molecule and a polarizing axis of the polarizing plate;

$\Delta n$: birefringence;

d: distance or gap between the upper and lower substrates (thickness of the liquid crystal layer); and $\lambda$: wavelength of the incident light.

So as to obtain the maximum transmittance T, the $\chi$ should be $\pi/4$ or the $\Delta nd/\lambda$ should be $\pi/2$ according to the equation 1. As the $\Delta nd$ varies with the birefringence difference of the liquid crystal molecules depending on the viewing directions, the value of $\lambda$ varies so as to make $\Delta nd/\lambda$ to be $\pi/2$. According to this condition, the color corresponding to the varied wavelength $\lambda$ appears in the screen.

Accordingly, as the value of $\Delta n$ relatively decreases at the viewing directions "a" and "c" toward the short axes of the liquid crystal molecules, the wavelength of the incident light for obtaining the maximum transmittance relatively decreases. Consequently, a blue color having shorter wavelength than a white color can be looked in the screen.

On the other hand, as the value of $\Delta n$ relatively increases at the viewing directions "b" and "d" toward the short axes of the liquid crystal molecules, the wavelength of the incident light relatively increases. Consequently, a yellow color having a longer wavelength than the white color can be looked in the screen.

Deterioration is caused in the resolution of IPS mode liquid crystal display.

Since the counter electrode 12 and the pixel electrode 14 of the IPS mode liquid crystal display are made of opaque metal layers, an aperture area of the liquid crystal display decreases, and the transmittance thereof also decreases. In addition, so as to obtain an appropriate brightness, a backlight with high intensity must be used and thus an electrical consumption increases, which is often undesirable.

To solve these limitations, a counter electrode 12 and a pixel electrode 14 made of a transparent material have been proposed. In such a liquid crystal liquid display the aperture ratio is often increased, but the transmittance is often not improved. To produce an in-plane electric field, the distance l between the electrodes 12 and 14 must often be set to be greater than the cell gap d. To obtain an appropriate intensity of the electric field, the electrodes 12 and 14 have relatively large dimension of width, for example, 10 to 20 $\mu$m.

However, if the electrodes have such a large dimension of width, the liquid crystal molecules positioned right above the upper surfaces of the electrodes 12 and 14 do not move thereby forming equipotential lines. As the result, since the liquid crystal molecules positioned right above the upper surfaces of the electrodes continue to hold an initial configuration even in the presence of the electric field, the transmittance is little increased.

SUMMARY OF THE INVENTION

Accordingly, it is one object of the present invention to improve picture quality of liquid crystal display.

It is another object of the present invention to improve transmittance and aperture ratio of the liquid crystal display.

So as to accomplish foregoing objects, this invention provides a liquid crystal display comprising:

an upper substrate and a lower substrate opposed to be spaced apart;

a liquid crystal layer interposed between the upper and lower substrates, the liquid crystal layer including a plurality of liquid crystal molecules;

a gate bus line and a data bus line formed on the lower substrate in a matrix configuration and defining unit pixel regions;

a counter electrode disposed at a unit pixel region in an inner surface of the lower substrate;

a pixel electrode overlapped with the counter electrode;

a thin film transistor disposed at an intersection of the gate bus line and the data bus line; and homogeneous alignment layers formed on the inner surfaces of the upper and lower substrates respectively, the homogeneous alignment layers including rubbing axes respectively, wherein, an electric field disposed parallel to the gate bus line and another electric field disposed parallel to the data bus line are simultaneously formed in the unit pixel region when a voltage is applied to the pixel electrode, wherein, the counter and pixel electrodes are made of a transparent conductive material, a distance between the counter and pixel electrodes is smaller than a distance between the upper and lower substrates, widths of the counter electrode and the pixel electrode are set such that the liquid crystal molecules overlying the counter and pixel electrodes are sufficiently aligned by the electric field being generated between the counter and pixel electrodes.

The present invention further provides a liquid crystal display comprising:

an upper substrate and a lower substrate opposed to be spaced apart;

a liquid crystal layer interposed between the upper and lower substrates, the liquid crystal layer including a plurality of liquid crystal molecules;

a gate bus line and a data bus line formed in the lower substrate in a matrix configuration and defining unit pixel regions;

a counter electrode disposed at each unit pixel region, the counter electrode including: a body of a rectangular frame shape; a center bar disposed across the center of a body thereby dividing the body region into a first space and a second space; at least a first branch being disposed parallel to the gate bus line and dividing the first space; and at least a second branch being disposed parallel to the data bus line and dividing the second space;

a pixel electrode overlapped with the counter electrode, the pixel electrode including: a first dividing electrode disposed between the body and the first branch and between the first branches and between the first branch and the center bar, and being parallel to the first branch; a second dividing electrode connecting one end of the first dividing electrode and being overlapped with the body; a third dividing electrode being disposed between the body and the second branch and between the second branches and being parallel to the second branch; a fourth dividing electrode connecting one end of the third dividing electrode and being connected to the second dividing electrode and overlapped with the center bar;

a thin film transistor disposed at an intersection of the gate bus line and the data bus line; and homogeneous alignment layers having rubbing axes respectively, disposed at inner surface of the upper and lower substrates, wherein the counter electrode and the pixel electrode are made of a transparent conductive material and a distance between the counter and pixel electrodes is smaller than a distance between the upper and lower substrates, widths of the counter electrode and the pixel electrode are set such that the liquid crystal molecules overlying the counter and pixel electrodes are sufficiently aligned by the electric field being generated between the counter and pixel electrodes.

Finally, the present invention further provides a liquid crystal display comprising:

an upper substrate and a lower substrate opposed to be spaced apart;

a liquid crystal layer interposed between the upper and lower substrates, the liquid crystal layer including a plurality of liquid crystal molecules;

a gate bus line and a data bus line formed in the lower substrate in a matrix configuration and defining unit pixel regions;

a counter electrode shaped of a rectangular plate and disposed at each unit pixel region;

a pixel electrode overlapped with the counter electrode, the pixel electrode including: at least one first dividing electrode being extended to a selected portion of the counter electrode in a direction parallel to the gate bus line; a second dividing electrode connecting one end of the first dividing electrode; a plurality of third dividing electrode being extended to a selected portion of the counter electrode in a direction parallel to the data bus line; and a fourth dividing electrode connecting one end of the third dividing electrode and simultaneously being connected to the second dividing electrode;

a thin film transistor disposed at an intersection of the gate bus line and the data bus line; and a homogeneous alignment layer having a rubbing axis disposed at each inner surface of the upper and lower substrates, wherein the counter electrode and the pixel electrode are made of a transparent material and widths of the pixel electrode and the counter electrode exposed by the pixel electrode are set such that the liquid crystal molecules overlying the counter and pixel electrodes are sufficiently aligned by the electric field being generated between the counter and pixel electrodes.

DETAILED DESCRIPTION OF THE PREFERRED EMBODIMENTS

Hereinafter, preferred embodiments of the present invention will be described in detail.

A counter electrode and a pixel electrode in the present invention are modified so that two domains are formed within a unit pixel region thereby preventing color shift occurrence.

In the present embodiments, an electric field of a breadth direction being parallel to a gate bus line is formed in one portion of a unit pixel and another electric field of a length direction being parallel to a data bus line is formed in the other portion of the unit pixel. By doing so, there are formed two liquid crystal domains, one driven in a direction being parallel to the gate bus line and the other driven in a direction being parallel to the data bus line, thereby compensating the refractive anisotropy of liquid crystal molecules.

Furthermore, in the present invention, the counter and pixel electrodes for driving the liquid crystal molecules are made of a transparent material, and their widths are determined such that an electric field being formed therebetween can affect upper portions of the counter and pixel electrodes sufficiently. By doing so, the transmittance and aperture ratio of the device are remarkably improved.

[First Embodiment]

Figure 1:
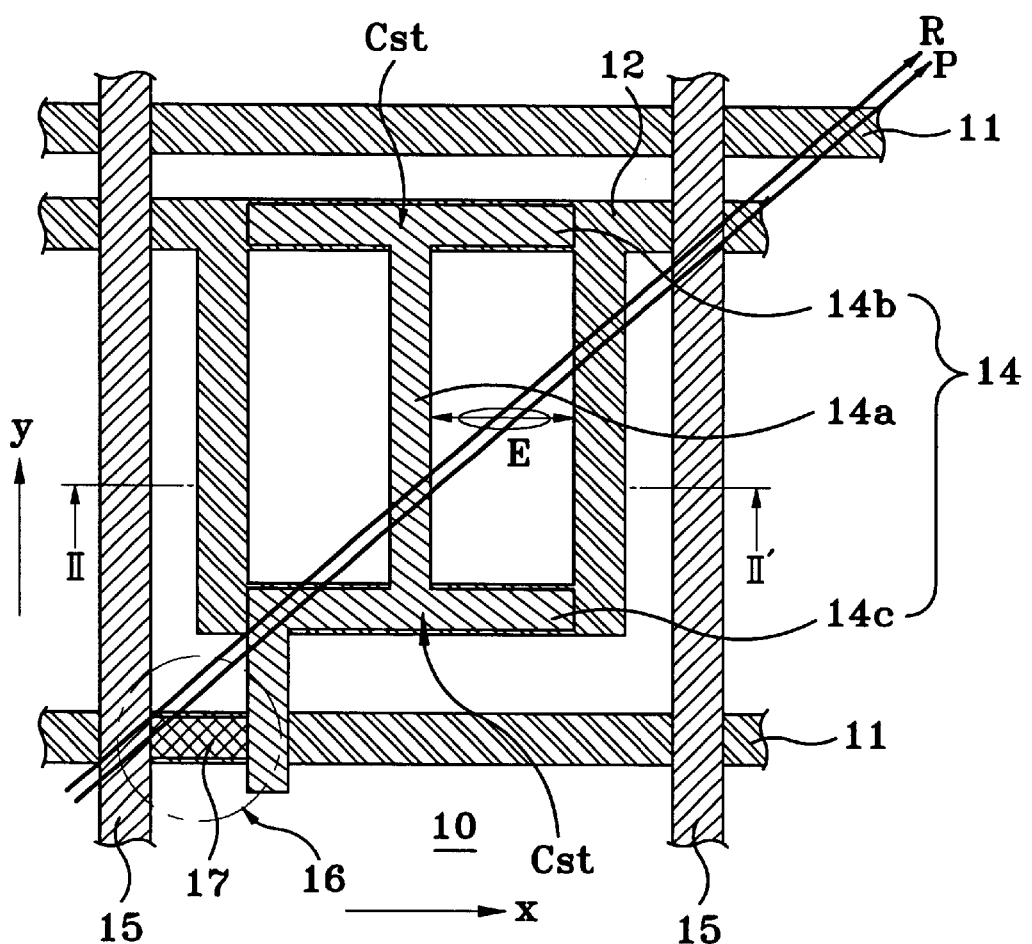
FIG. 1 is a plan view showing a lower substrate of conventional IPS mode liquid crystal display.
Figure 2:
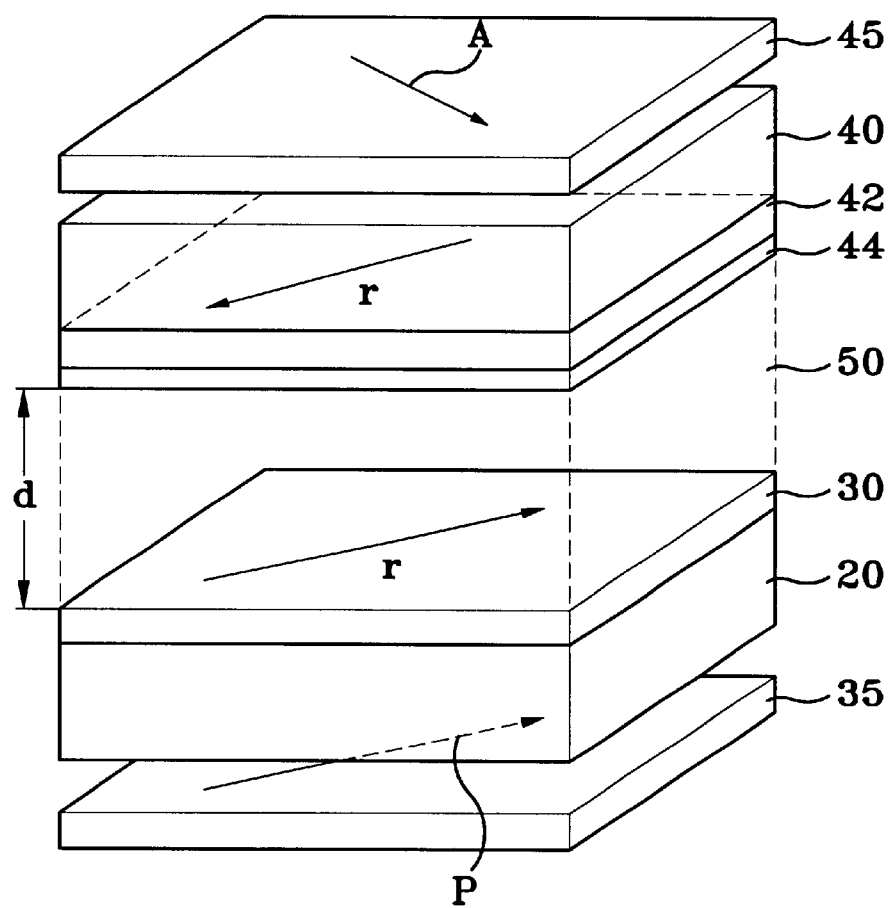
FIG. 2 is a perspective view of a liquid crystal display according to the present invention.
Figure 2:
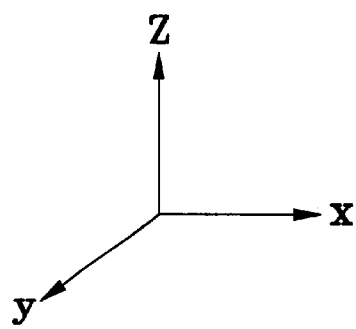
Figure 3:
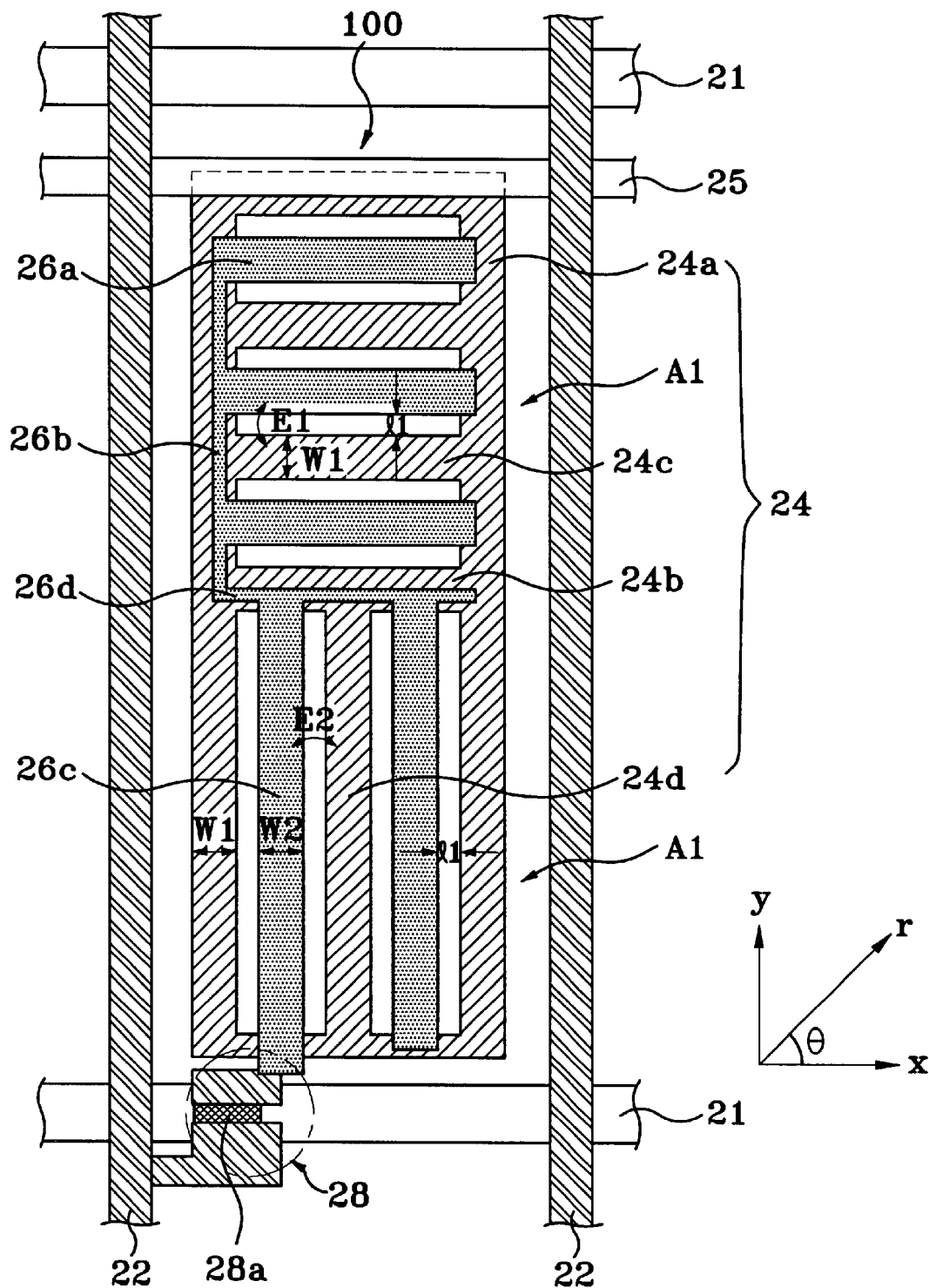
FIG. 3 is a plan view showing a lower substrate of the liquid crystal display according to a first embodiment of the present invention.
Figure 4:
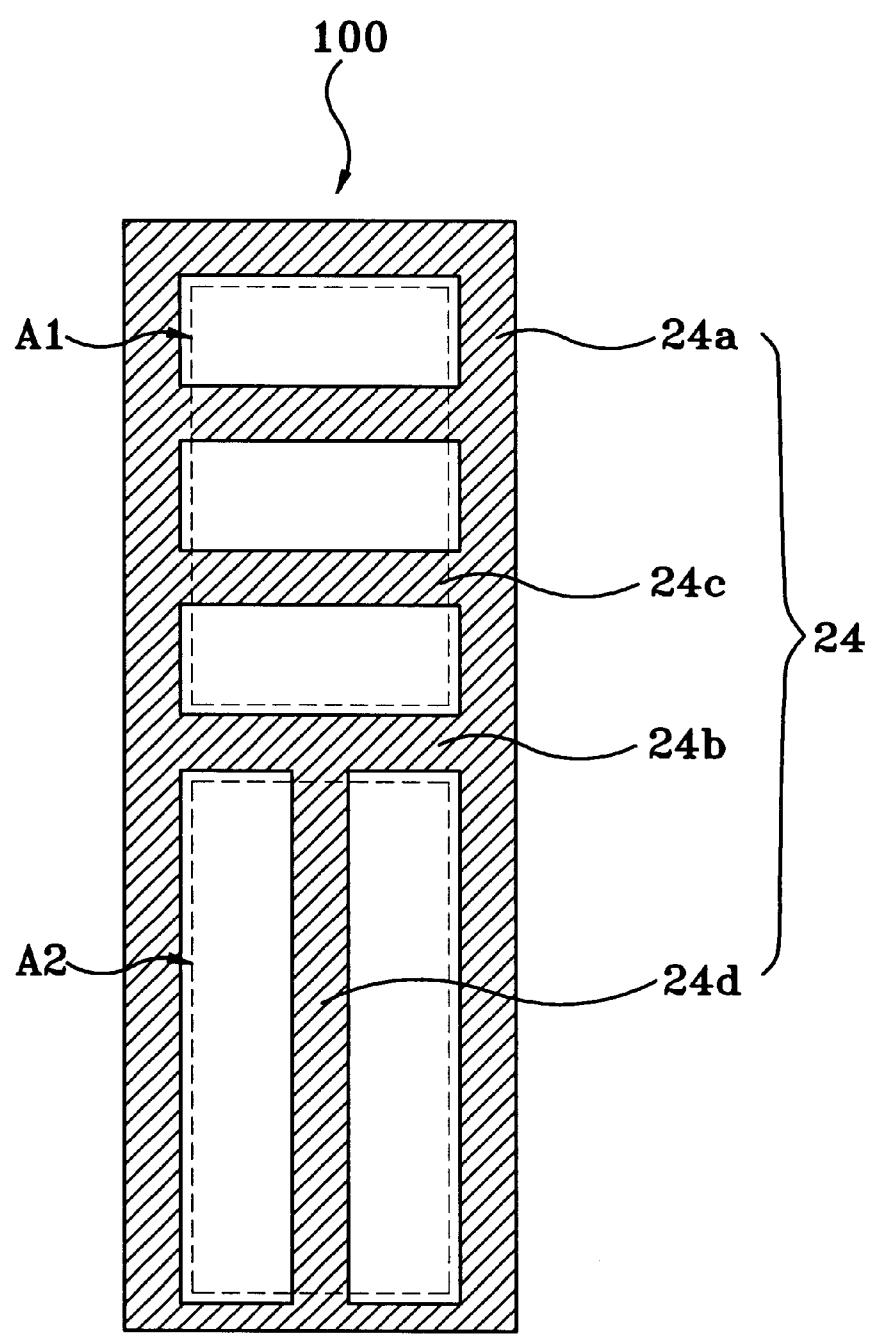
FIG. 4 is a plan view showing a counter electrode of the liquid crystal display according to the first embodiment of the present invention.
Figure 5:
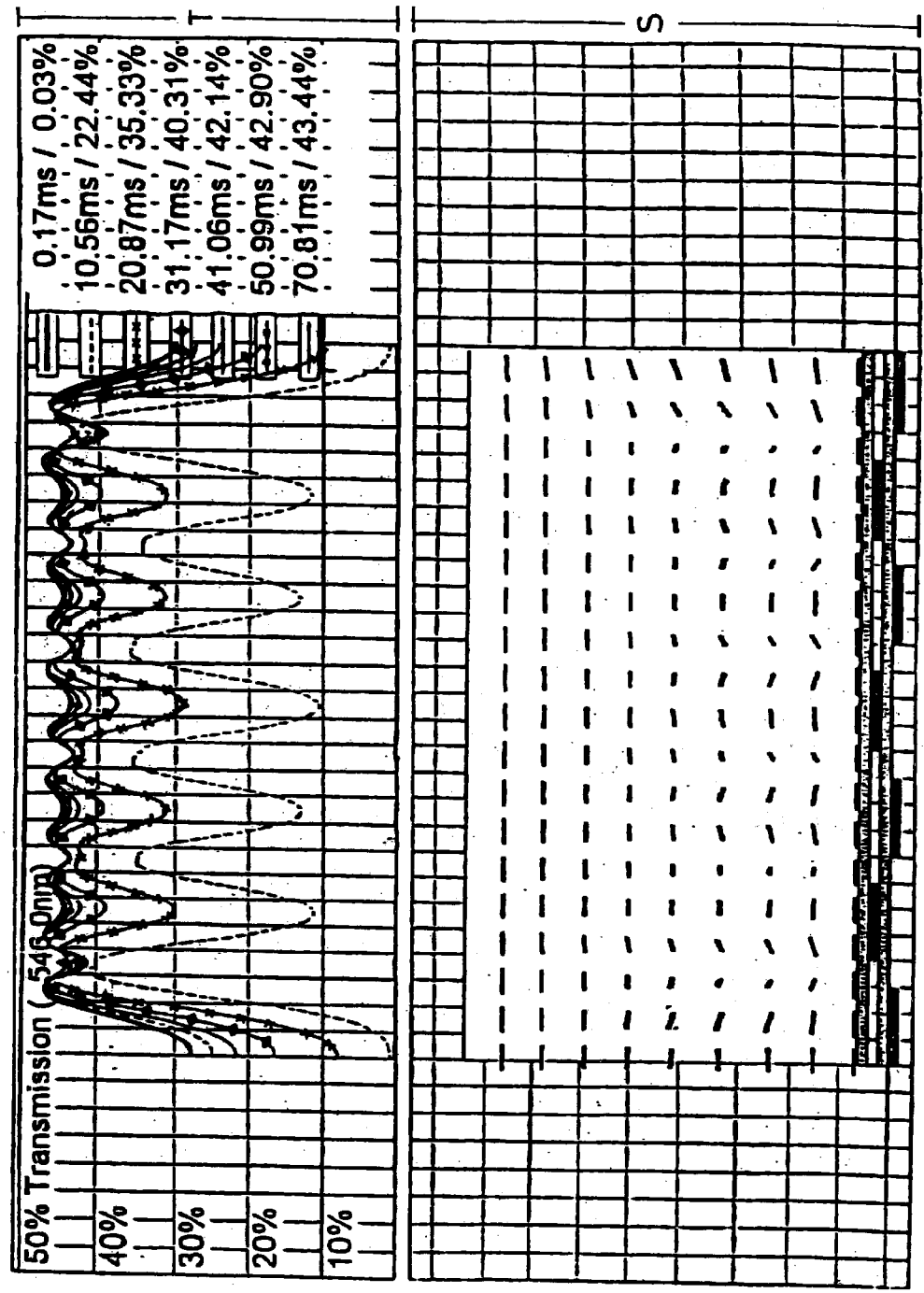
FIG. 5 shows a simulation result of the liquid crystal display according to the first embodiment.

FIG. 2 is a perspective view of a liquid crystal display according to the present invention. FIG. 3 is a plan view showing a lower substrate of the liquid crystal display according to a first embodiment of the present invention. FIG. 4 is a plan view showing a counter electrode of the liquid crystal display according to the first embodiment of the present invention. FIG. 5 shows a simulation result of the liquid crystal display according to the first embodiment.

Referring to FIGS. 2 to 4, a plurality of gate bus line 21 are extended in a direction of an x-axis on a lower substrate 20, and a plurality of data bus line 22 are extended in a direction of a y-axis thereby defining unit pixel regions 100 of a matrix type.

A gate insulating layer (not shown) is interposed between the gate bus line 21 and the data bus line 22. Namely, the gate bus line 21 is disposed on a surface of the lower substrate 20 and the gate insulating layer is coated thereon, and the data bus line 22 is disposed on a surface of the gate insulating layer.

Within the unit pixel region 100 surrounded by the gate bus line 21 and the data bus line 22, a counter electrode 24 is disposed. Referring to FIG. 4, the counter electrode 24 includes a body 24a having a rectangular frame shape and a center bar 24b being parallel in the x-axis and dividing the region within the body 24a. Herein, the region within the body 24a is defined as a first space A1 and a second space A2 by the center bar 24b.

There is formed at least a first branch 24c in a direction parallel to the x-axis within the first space A1. The first branch 24c is interposed with a regular distance between an upper portion of the body 24c and the center bar 24b. In the present embodiment, two first branches 24c are formed.

There is formed at least a second branch 24d in a direction parallel to the y-axis within the second space A2. The second branch 24d is interposed with a regular distance between a left side and a right side of the body 24a. In the present embodiment, one second branch 24d is formed.

Herein, the counter electrode 24 is made of a transparent metal film, for example indium tin oxide (ITO) and dimensions of the first space A1 and the second space A2 are preferably equal. Further, widths W1 of the body 24a of the counter electrode 24, the center bar 24b, the first branch 24c and the second branch 24d are in the range of 2.3~5 $\mu$m.

The counter electrode 24 is disposed parallel to the gate bus line 21 and is in contact with a common signal line 25 transmitting common signals. Herein, the common signal line 25 is made of an opaque metal film.

The pixel electrode 26 is also formed within the unit pixel region 100. The pixel electrode 26 includes first dividing electrodes 26a being disposed in the first space A1 and extended in the x-axis. The first dividing electrodes 26a are disposed between the upper portion of the body 24a and the first branch 24c, between the first branches 24c, and between the first branch 24c and the center bar 24b. The pixel electrode 26 also includes a second dividing electrode 26b connecting one end of the first driving electrode 26a and overlapping the left side (or the right side) of the body 24a of the counter electrode 24. Further, the pixel electrode 26 includes a third dividing electrode 26c which is disposed between the left side of the body 24a in the second space A2 and the second branch 24d, between the second branch 24d and the right side of the body 24a, and a fourth dividing electrode 26d which is connecting one end of the third driving electrode 26c and is overlapped with the center bar 24b of the counter electrode 24 and is connected to the second dividing electrode 26d.

Herein, a storage capacitance is formed at a region where the second dividing electrode 26b and the fourth dividing electrode 26d are formed. Widths of the second and fourth driving electrodes 26b and 26d are set in the range that an appropriate storage capacitance is formed, for example equal to or smaller than the widths of the body 24a and the center bar 24b.

Widths W2 of the first dividing electrode 26a and the third dividing electrode 26c are set preferably equal to those of the first branch 24c and the second branch 24d.

Further, distances l1 between the first dividing electrode 26a and the upper portion of the body 24a, between the first dividing electrode 26a and the first branch 24c, and between the first dividing electrode 26a and the center bar 24b, i.e. widths of regions where the electric fields of length direction are formed, are designed to be smaller than a distance between the lower substrate 20 and the upper substrate 40 m i.e. a cell gap d.

Further, distances l1 between the left side (or the right side) of the body 24a and the second dividing electrode 26b, between the second dividing electrode 26b and the first branch 24c, i.e. widths of regions where the electric fields of breadth direction are formed, are designed to be smaller than the cell gap d. Preferably, the cell gap d is set in the range of 3.5~4 $\mu$m when the distance l1 is set in the range of 0.1~3 $\mu$m.

The pixel electrode 26 is also made of a transparent conductive material and the widths W1,W2 are preferably greater than the distance l1.

As noted, the counter electrode 24 and the pixel electrode 26 are insulated by the gate insulating layer.

A thin film transistor 28 for switching a signal from the data bus line into the pixel electrode 26, is formed adjacent to an intersection of the gate bus line 21 and the data bus line 22. In the thin film transistor 28 as known in the art, the gate line 21 becomes a gate electrode, an amorphous silicon layer 28a becomes a channel layer, a region extended from the data bus line 22 becomes a drain electrode and a region extended from the pixel electrode 26 becomes a source electrode.

An alignment layer 30 is formed on a resultant structure of the lower substrate 20. The alignment layer 30 is a homogeneous alignment layer having a pretilt angle of below 10°, and the alignment layer 30 is rubbed in an R direction which makes a selected angle θ, preferably 45° with the x-axis (or the y-axis).

A color filter 42 is arranged in an inner surface of the upper substrate 40 and a homogeneous alignment layer 44 is formed on the color filter 42. Herein, the homogeneous alignment layer is rubbed in an anti-parallel direction to the R direction.

A polarizer 35 is disposed at an outer surface of the lower substrate 20, and an analyzer 45 is disposed at an outer surface of the upper substrate 40. Herein, a polarizing axis P of the polarizer 35 is coincided with the rubbing axis R of the alignment layer 30 in the lower substrate 20, and an absorbing axis A of the analyzer 45 is perpendicular to the polarizing axis P.

A liquid crystal layer 50 is interposed between the lower substrate 20 and the upper substrate 40. As for the liquid crystal, both materials of positive dielectric anisotropy and negative dielectric anisotropy can be used. In the present embodiment, for example the material of negative dielectric anisotropy is used. Further, the type of liquid crystal molecules is determined so that the phase retardation, i.e. the product of the refractive anisotropy Δn of liquid crystal molecules within the liquid crystal layer 50 and the cell gap d becomes 0.2~0.6 $\mu$m.

Hereinafter, operation of the liquid crystal display according to the present embodiment.

First of all, if the gate bus line 21 is not selected, no picture signal is transmitted to the pixel electrode 26 and no electric field is formed between the counter electrode 24 and the pixel electrode 26. Therefore, an incident light to pass the polarizer 35 is linearly polarized and the light does not change its direction while passing the liquid crystal layer 50. That means, the processing direction of the light is not changed since long axes of liquid crystal molecules (not shown) are arranged parallel to the rubbing axis R of the alignment layer 30 in the lower substrate 20. Accordingly, the light can not pass the analyzer 45 having the absorbing axis A which is disposed perpendicular to the polarizing axis P. The screen shows dark state.

In the meantime, when a scanning signal is applied to the gate bus line 21 and a picture signal is applied to the data bus line 22, the thin film transistor 28 at the intersection of the gate bus line 21 and the data bus line 22, is turned on thereby transmitting the picture signal to the pixel electrode 26. At this time, electric fields E1,E2 are formed between the counter electrode 24 and the pixel electrode 26 since a common signal having a selected degree of voltage difference with respect to the picture signal is continuously applied to the counter electrode 24.

At this time, the electric fields are substantially formed between upper portions of the body 24a and the first dividing electrode 26a, between the first branch 24c and the first dividing electrode 26a, between the center bar 24b and the first dividing electrode 26a, between the left side of the body 24a and the third dividing electrode 26c, between the second branch 24d and the third dividing electrode 26c, and between the right side of the body 24a and the third dividing electrode 26c. Herein, the electric fields are formed as the normal line of the electrodes, therefore the electric field E1 of y-axis direction is formed on the first space A1 and the electric field E2 of x-axis direction is formed in the second space A2.

Herein, the intensity ratio (E1/E2) of the electric field E1 in the first space A1 to the electric field E2 in the second space A2 is in the range of 0.3~1.3, more preferably 1.

As described, the electric field E1 of y direction and the electric field E2 of x direction are formed within the unit pixel region at the same time, the liquid crystal molecules having a selected angle θ, for example approximately 45° with the x-axis and the y-axis are twisted so that their short axes are arranged parallel to their corresponding electric fields E1,E2.

At this time, the liquid crystal molecules in the first space A1 are twisted in a clockwise direction so that their short axes are coincided with the electric field E1 and the liquid crystal molecules in the second space A2 are twisted in a counter-clockwise direction so that their short axes are coincided with the electric field E2. Therefore, two domains are formed within a unit pixel region.

Accordingly, the user in all azimuth angles can see the long and short axes of the liquid crystal molecules simultaneously, the refractive anisotropy of the liquid crystal molecules is compensated. Therefore, no color shift is occurred.

Furthermore, the counter electrode 24 and the pixel electrode 26 are made of a transparent conductive film and they are spaced such that the dimension of a region where electric field is formed, is smaller than the cell gap. The widths of the counter electrode 24 and the pixel electrode 26 where the electric field is substantially formed, are formed such that the electric field can affect upper portions of the electrodes 24,26 sufficiently whereby the liquid crystal molecules overlying the counter electrode 24 and the pixel electrode 26 are all twisted. Therefore, the transmittance and the aperture ratio of the liquid crystal display are improved.

FIG. 5 shows a simulation result where the liquid crystal display is constituted as above, In the drawing, "S" indicates a section of the lower substrate and liquid crystal molecules and "T" stands for the transmittance.

As shown in the drawing, the electric field is applied to the upper portions of the electrodes and then the liquid crystal molecules thereon are all twisted. Therefore, a uniform transmittance is shown in all regions.

Furthermore, the electrodes 24,26 are arranged densely. Therefore, high transmittance of approximately 40.31% is shown in the lapse of 31.17 ms after the application of voltage to the pixel electrode 26.

[Second Embodiment]

Figure 6:
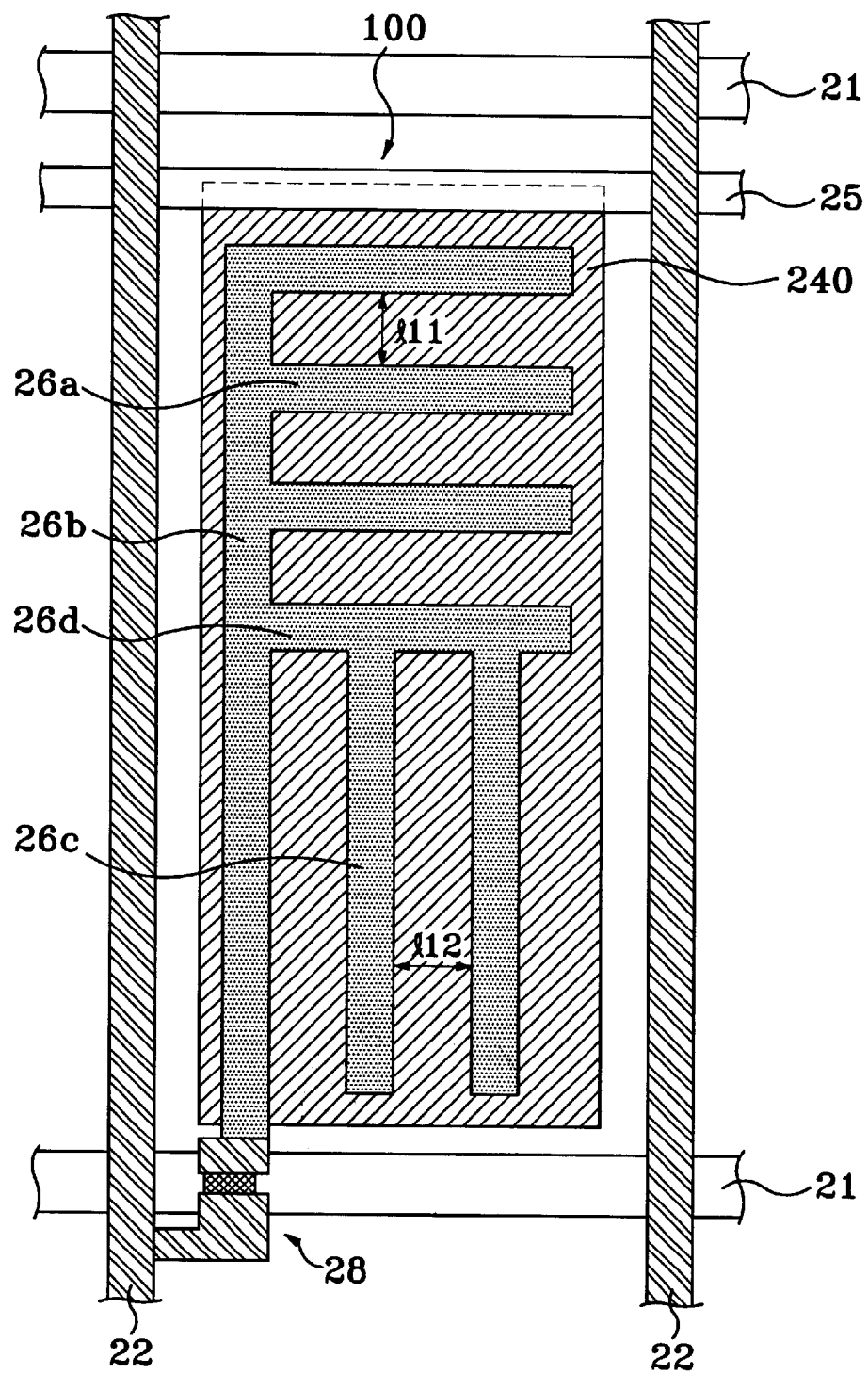
FIG. 6 is a plan view showing a lower substrate of a liquid crystal display according to a second embodiment of the present invention.
Figure 7:
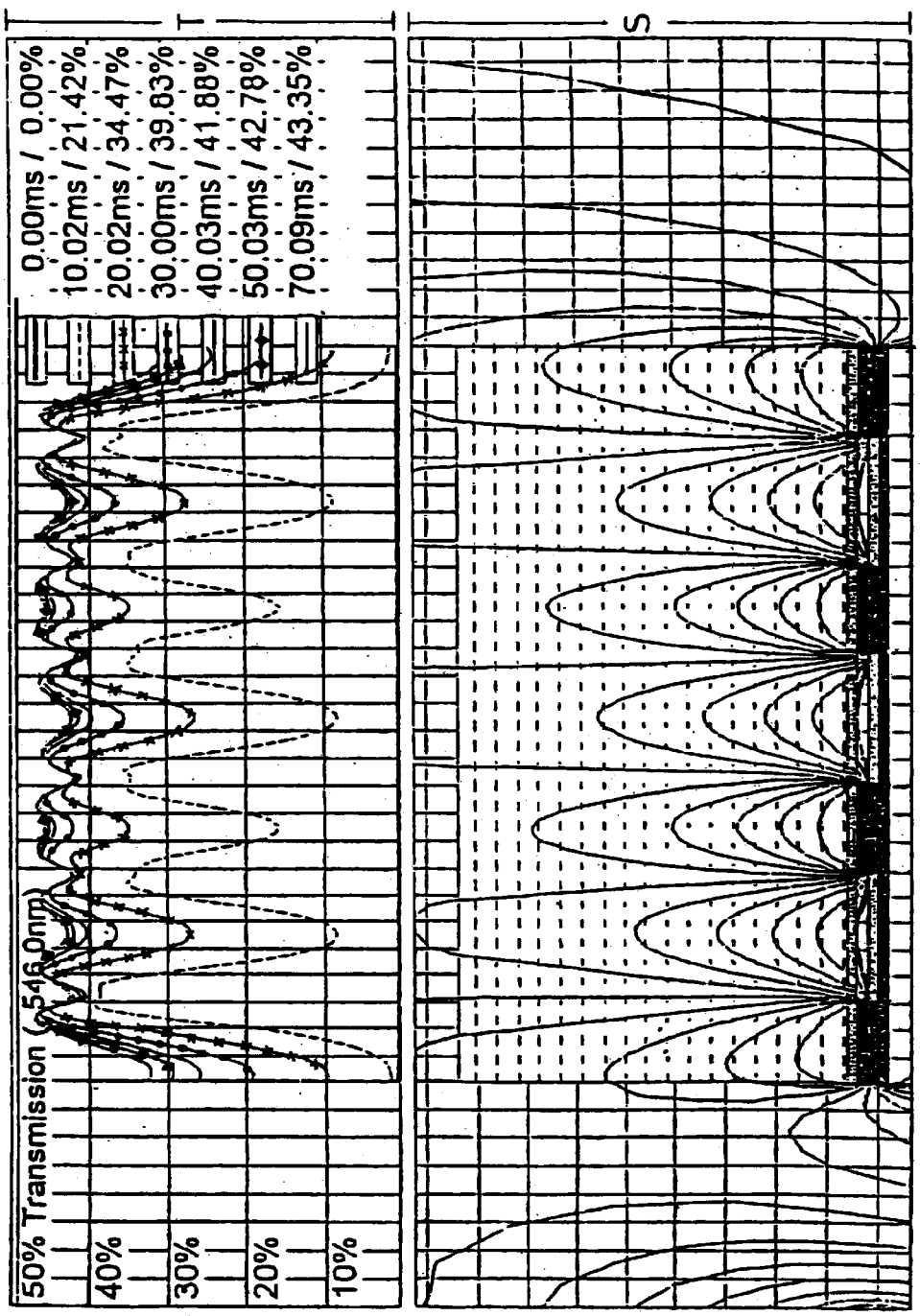
FIG. 7 shows a simulation result of the liquid crystal display according to the second embodiment of the present invention.

FIG. 6 is a plan view showing a lower substrate of a liquid crystal display according to a second embodiment of the present invention. FIG. 7 shows a simulation result of the liquid crystal display according to the second embodiment of the present invention.

In the second embodiment, the same the gate bus line 21, the data bus line 22, the common electrode line 25 and the thin film transistor as in the first embodiment are used, except the counter and pixel electrodes being changed at some portions thereof.

Referring to FIG. 6, the counter electrode 240 in the present embodiment is made of a transparent conductive film in a rectangular plate shape. Herein, the counter electrode 240 is separated from the gate bus line 21 and the data bus line 22 by a selected distance.

The pixel electrode 26 is overlapped on the counter electrode 240. The pixel electrode 26 includes at least one first dividing electrode 26a being arranged with a regular distance, a second dividing electrode 26b connecting one end of the first dividing electrode 26a, at least one third dividing electrode 26c being arranged with a regular distance, and a fourth dividing electrode 26d connecting one end of the third dividing electrode 26c and simultaneously being connected to the second dividing electrode 26b. Herein, the second dividing electrode 26b is extended in an y-axis direction and the fourth dividing electrode 26d is extended in an x-axis direction. At this time, a distance l11 between the first dividing electrodes 26a and a distance l12 between the third dividing electrodes 26c are preferably equal to each other and the distances l11, l12 are set over 1 μm. The ratio of the distance l11 or l12 to the cell gap is in the range of 0.1~5 preferably and the ratio of the widths of electrodes 26a, 26c to the distance l11 or l12 is in the range of 0.2~5. In the present embodiment, the distance between the counter and pixel electrode is equivalent to the thickness of an insulating layer.

Operation of the liquid crystal display according to the present embodiment is the same as in the first embodiment.

FIG. 7 shows a simulation result of the liquid crystal display as constituted above. Also the liquid crystal molecules overlying the counter electrode 240 and the pixel electrode 26 are all twisted thereby improving the transmittance and the aperture ratio.

According to the drawing, high transmittance of approximately 41.88% is shown in the lapse of 40.03 ms after the application of voltage to the pixel electrode 26. This indicates a remarkable improvement in the transmittance of liquid crystal displays, compared to the conventional IPS mode liquid crystal display showing a transmittance of 23% in the lapse of 50 ms.

As described above in detail, according to this invention, the user in all azimuth angles can see the long and short axes of the liquid crystal molecules since horizontal and vertical electric fields are formed at the same time. Therefore, no color shift is shown and the picture quality of the device is improved.

Various other modifications will be apparent to and can be readily made by those skilled in the art without departing from the scope and spirit of the present invention.

What is claimed is:

1. A liquid crystal display of high aperture ratio and high transmittance having multi-domain comprising:

an upper substrate and a lower substrate opposed and spaced apart;

a liquid crystal layer interposed between the upper and lower substrates, the liquid crystal layer including a plurality of liquid crystal molecules;

a gate bus line and a data bus line formed on the lower substrate in a matrix configuration and defining unit pixel regions;

a counter electrode disposed at a unit pixel region in an inner surface of the lower substrate;

a pixel electrode overlapped with the counter electrode;

a thin film transistor disposed at an intersection of the gate bus line and the data bus line; and homogeneous alignment layers formed on the inner surfaces of the upper and lower substrates respectively, the homogeneous alignment layers including rubbing axes respectively, wherein, an electric field disposed parallel to the gate bus line and another electric field disposed parallel to the data bus line are simultaneously formed in the unit pixel region when a voltage is applied to the pixel electrode, wherein, the counter and pixel electrodes are made of transparent conductive material, a distance between the counter and pixel electrodes is smaller than a distance between the upper and lower substrates, widths of the counter electrode and the pixel electrode are set such that the liquid crystal molecules overlying the counter and pixel electrodes are sufficiently driven by the electric field being generated between the counter and pixel electrodes.

2. The liquid crystal display of claim 1, wherein an intensity ratio of the electric field being parallel to the gate bus line to the electric field being parallel to the data bus line is set in the range of 0.3~1.3.

3. The liquid crystal display of claim 1, further comprising a polarizer disposed at an outer surface of the lower substrate and an analyzer disposed at an outer surface of the upper substrate, wherein a polarizing axis of the polarizer coincides with the rubbing axis of the homogeneous alignment layer on the lower substrate, wherein an absorbing axis of the analyzer is perpendicular to the polarizing axis.

4. The liquid crystal display of claim 3, wherein the rubbing axis of homogeneous alignment layer in the lower substrate makes a selected angle with the gate bus line and the data bus line respectively, and the rubbing axis of homogeneous alignment layer in the upper substrate forms a 180° angle with the rubbing axis of homogeneous alignment layer in the lower substrate.

5. The liquid crystal display of claim 4, wherein the rubbing axis of homogeneous alignment layer in the lower substrate makes approximately 45° with the gate bus line and the data bus line respectively.

6. The liquid crystal display of claim 1, wherein the product of refractive anisotropy of the liquid crystal and cell gap of said two substrates is in the range of 0.2~0.6 $\mu$m.

7. A liquid crystal display of high aperture ratio and high transmittance having multi-domain comprising:

an upper substrate and a lower substrate opposed and spaced apart;

a liquid crystal layer interposed between the upper and lower substrates, the liquid crystal layer including a plurality of liquid crystal molecules;

a gate bus line and a data bus line formed in the lower substrate in a matrix configuration and defining unit pixel regions;

a counter electrode disposed at each unit pixel region, the counter electrode including: a body of a rectangular frame shape; a center bar disposed across the center of a body thereby dividing the body region into a first space and a second space; one or more branches, disposed parallel to the gate bus line, dividing the first space into a first plurality of areas; and one or more branches, disposed parallel to the data bus line, dividing the second space into a second plurality of areas;

a pixel electrode overlapping a selected portion of the counter electrode, the pixel electrode including: a first plurality of dividing electrodes, disposed parallel to the gate bus line, dividing the first plurality of areas; a first connecting electrode, overlapping the body of the counter electrode, connecting a first end of each of the first plurality of dividing electrodes; a second plurality of dividing electrodes, disposed parallel to the data bus line, dividing the second plurality of areas; and a second connecting electrode, overlapping the center bar, connecting a first end of each of the second plurality of dividing electrodes;

a thin film transistor disposed at an intersection of the gate bus line and the data bus line; and homogeneous alignment layers having rubbing axes respectively, disposed at inner surface of the upper and lower substrates, wherein the counter electrode and the pixel electrode are made of transparent conductive material and a distance between the counter and pixel electrodes is smaller than a distance between the upper and lower substrates, widths of the counter electrode and the pixel electrode are set such that the liquid crystal molecules overlying the counter and pixel electrodes are sufficiently driven by the electric field being generated between the counter and pixel electrodes.

8. The liquid crystal display of claim 7, wherein an intensity ratio of the electric field in the first space to the electric field in the second space is set in the range of 0.3~1.3.

9. The liquid crystal display of claim 7, wherein widths of the body, the center bar, the first branch and the second branch of the counter electrode and widths of the first dividing electrode and the third dividing electrode of the pixel electrode are greater than distances between the body and the first branch, between the first branches, between the first branch and the center bar, between the body and the second branch, and between the second branches.

10. The liquid crystal display of claim 9, wherein the widths of the body, the center bar, the first branch and the second branch of the counter electrode and the widths of the first dividing electrode and the third dividing electrode of the pixel electrode are in the range of 2.5~5 $\mu$m respectively.

11. The liquid crystal display of claim 10, wherein the distances between the body and the first branch, between the first branches, between the first branch and the center bar, between the body and the second branch, and between the second branches are in the range of 0.1~3 $\mu$m.

12. The liquid crystal display of claim 7, further comprising a polarizer disposed at an outer surface of the lower substrate and an analyzer disposed at an outer surface of the upper substrate, wherein a polarizing axis of the polarizer coincides with the rubbing axis of the homogeneous alignment layer on the lower substrate, wherein an absorbing axis of the analyzer is perpendicular to the polarizing axis.

13. The liquid crystal display of claim 12, wherein the rubbing axis of homogeneous alignment layer in the lower substrate makes a selected angle with the gate bus line and the data bus line respectively, and the rubbing axis of homogeneous alignment layer in the upper substrate forms a 180° angle with the rubbing axis of homogeneous alignment layer in the lower substrate.

14. The liquid crystal display of claim 13, wherein the rubbing axis of homogeneous alignment layer in the lower substrate forms a 45° angle with the gate bus line and the data bus line respectively.

15. The liquid crystal display of claim 7, wherein the product of refractive anisotropy of the liquid crystal and cell gap of said two substrates is in the range of 0.2~0.6 $\mu$m.

16. A liquid crystal display of high aperture ratio and high transmittance having multi-domain comprising:

an upper substrate and a lower substrate opposed and spaced apart;

a liquid crystal layer interposed between the upper and lower substrates, the liquid crystal layer including a plurality of liquid crystal molecules;

a gate bus line and a data bus line formed in the lower substrate in a matrix configuration and defining unit pixel regions;

a counter electrode shaped of a rectangular plate and disposed at each unit pixel region;

a pixel electrode overlapping a selected portion of the counter electrode, the pixel electrode including: one or more dividing electrodes, disposed parallel to the gate bus line, extending to a selected portion of the counter electrode in a direction; a first connecting electrode connected to one end of the one or more dividing electrodes; a first plurality of dividing electrodes extending to a selected portion of the counter electrode in a direction parallel to the data bus line; and a second connecting electrode connected to a first end of the first plurality of dividing electrodes and being connected to the first connecting electrode;

a thin film transistor disposed at an intersection of the gate bus line and the data bus line; and a homogeneous alignment layer having a rubbing axis disposed at each inner surface of the upper and lower substrates, wherein the counter electrode and the pixel electrode are made of a transparent material and widths of the pixel electrode and the counter electrode exposed by the pixel electrode are set such that the liquid crystal molecules overlying the counter and pixel electrodes are sufficiently driven by the electric field being generated between the counter and pixel electrodes.

17. The liquid crystal display of claim 16, wherein an intensity ratio of the electric field in a space where the first dividing electrode is formed, to the electric field in a space where the third dividing electrode is formed, is set in the range of 0.3~1.3.

18. The liquid crystal display of claim 17, wherein the distances between the first dividing electrodes and between the third dividing electrodes of the pixel electrode are over 1 $\mu$m.

19. The liquid crystal display of claim 18, wherein the ratio of the width of the first dividing electrode (or the third dividing electrode) to the distance between the first dividing electrodes (or the third dividing electrodes) is in the range of 0.2~5.

20. The liquid crystal display of claim 16, further comprising a polarizer disposed at an outer surface of the lower substrate and an analyzer disposed at an outer surface of the upper substrate, wherein a polarizing axis of the polarizer is coincided with the rubbing axis of the homogeneous alignment layer on the lower substrate, wherein an absorbing axis of the analyzer is perpendicular to the polarizing axis.

21. The liquid crystal display of claim 20, wherein the rubbing axis of homogeneous alignment layer in the lower substrate makes a selected angle with the gate bus line and the data bus line respectively, and the rubbing axis of homogeneous alignment layer in the upper substrate forms a 180° angle with the rubbing axis of homogeneous alignment layer in the lower substrate.

22. The liquid crystal display of claim 21, wherein the rubbing axis of homogeneous alignment layer in the lower substrate forms a 45° angle with the gate bus line and the data bus line respectively.

23. The liquid crystal display of claim 16, wherein the product of refractive anisotropy of the liquid crystal and cell gap of said two substrates is in the range of 0.2~0.6 $\mu$m.

* * * * *